Feb. 2, 1960
C. W. MacMILLAN
2,923,149
AUTOMOTIVE VEHICLE TEST DEVICE
Filed July 11, 1956
3 Sheets-Sheet 1
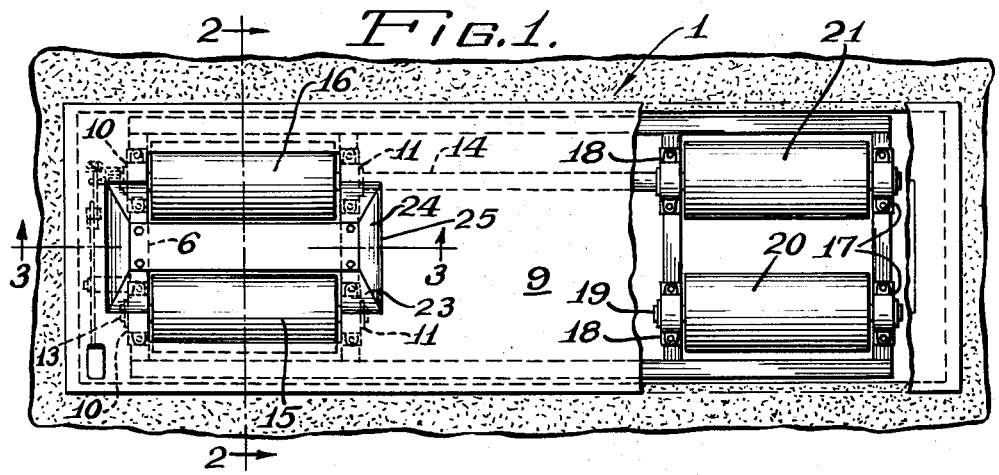
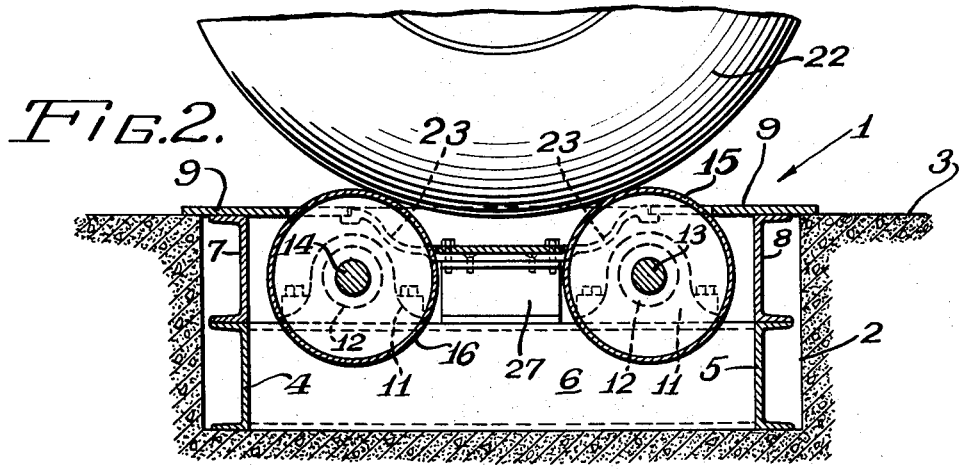
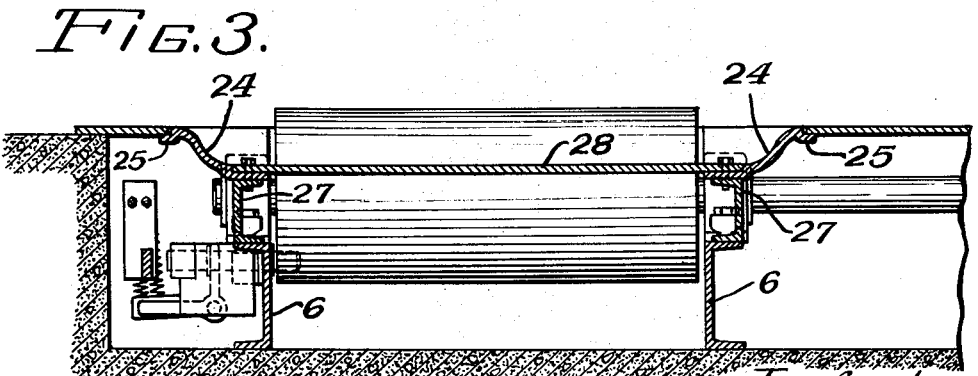
Inventor:
Charles W. MacMillan
By Gary, Desmond & Parker
Attys.

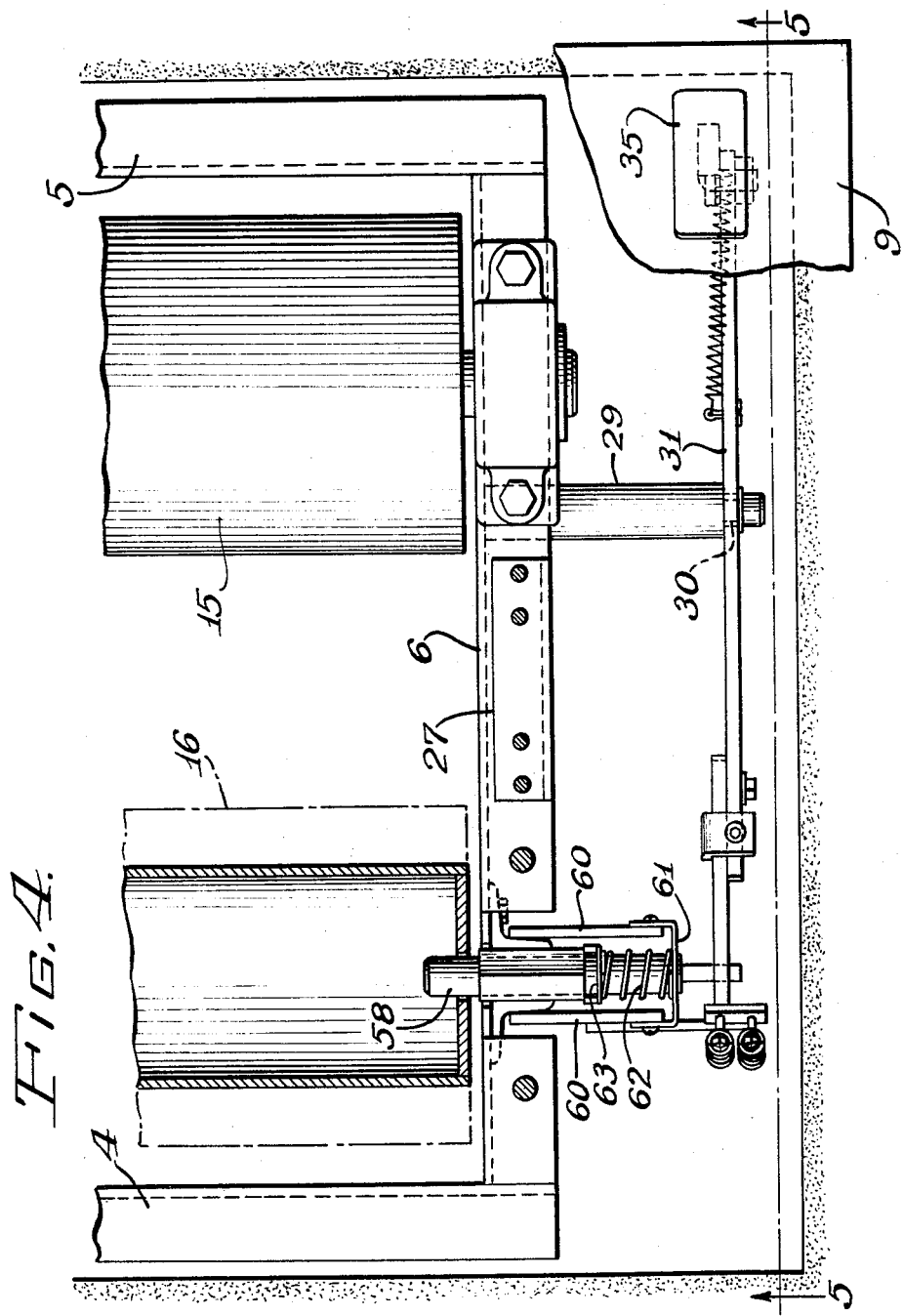

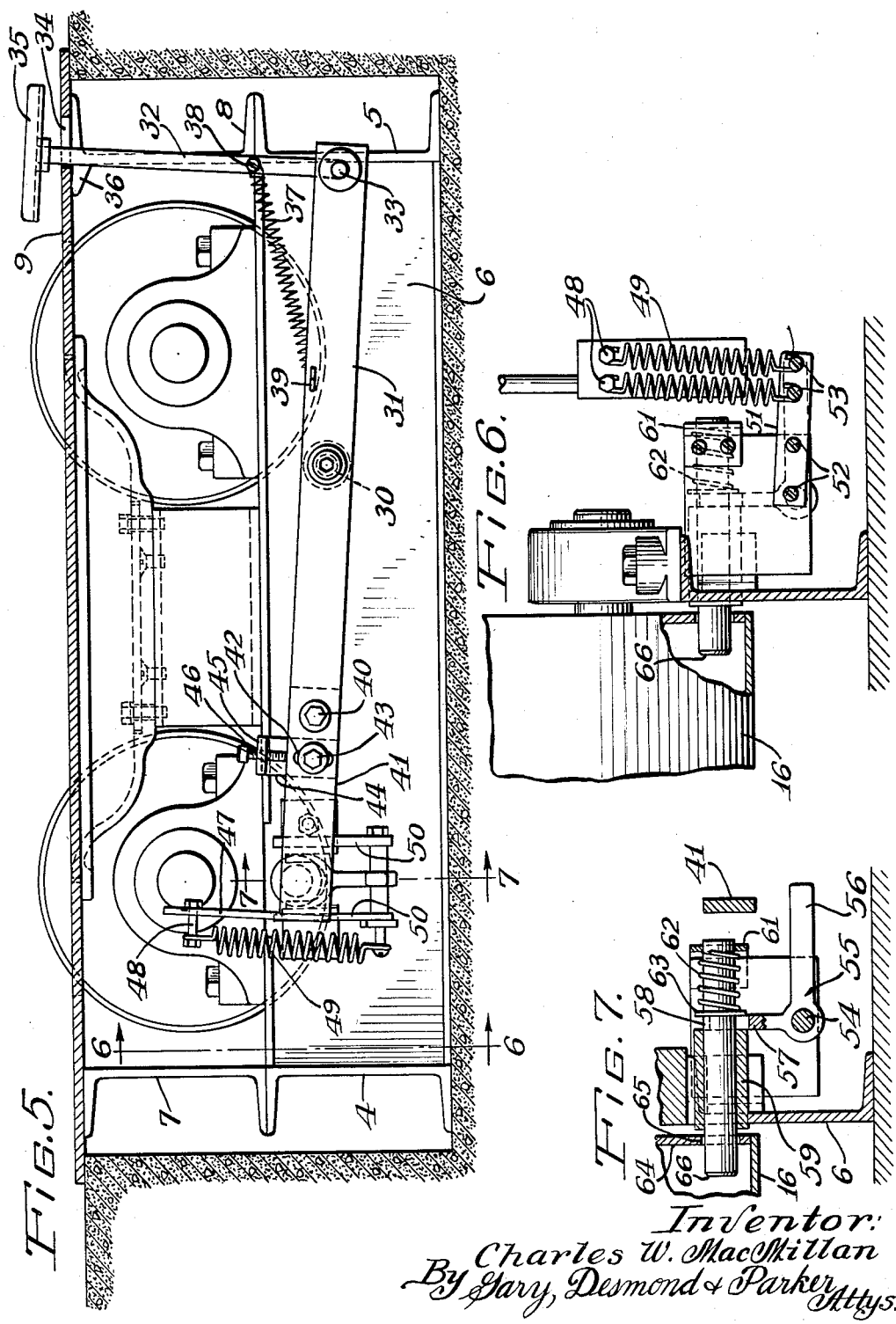

United States Patent Office 2,923,149
Patented Feb. 2, 1960

2,923,149

AUTOMOTIVE VEHICLE TEST DEVICE

Charles W. MacMillan, Rock Island, Ill., assignor to Bear Manufacturing Company, Rock Island, Ill., a corporation of Delaware Application July 11, 1956, Serial No. 597,281

3 Claims. (Cl. 73—117)

This invention relates to improvements in a device for simulating actual road conditions in a shop or other confined space for testing the operating characteristics of automotive vehicles.

In testing some of the operating characteristics of automotive vehicles road tests of the vehicles have been essential. For instance, in testing automatic transmissions wherein the gears are automatically shifted under predetermined conditions, those conditions could heretofore only be obtained by actual road tests of the vehicles. Road tests are usually time-consuming and in many congested areas are substantially impossible.

The present invention contemplates a simple device comprising means whereby road testing conditions may be simulated, the device being such that the simulated conditions may be obtained in a shop or garage.

The features and advantages of the present invention will be apparent from the accompanying drawings and the following detailed description.

In the drawings,

Fig. 1 is a top plan view of a device embodying the concepts of the present invention.

Fig. 2 is an enlarged sectional view taken on line 2—2 of Fig. 1.

Fig. 3 is an enlarged sectional view taken on line 3—3 of Fig. 1.

Fig. 4 is an enlarged fragmentary plan view, partly in section, illustrating a pair of supporting rollers together with a portion of the brake mechanism associated with one of the rolls.

Fig. 5 is a sectional view taken on line 5—5 of Fig. 4.

Fig. 6 is a detailed sectional view taken on line 6—6 of Fig. 5.

Fig. 7 is a detailed sectional view taken on line 7—7 of Fig. 5.

Referring in detail to the drawings, 1 indicates generally a testing device embodying the features of the present invention. The device 1 is positioned in a pit 2 provided in the floor 3 of a garage, shop or other confined space. A pair of opposite parallel disposed channel irons 4 and 5 are positioned at the bottom of the pit 2 and extend a major portion of the length of the pit, but terminating short of the ends of the pit. The channel irons 4 and 5 are spaced from each other by a plurality of transverse channel irons 6 which are spaced from each other along the length of the channel irons 4 and 5 whereby a firm substructure is formed for the device 1.

A plurality of spaced channel-sectioned supports 7 and 8 are mounted upon the channel irons 4 and 5, respectively, which carry, at their upper flanges, a cover plate 9 which is disposed substantially flush with the floor 3.

A pair of pillow blocks 10 are mounted upon an endmost cross channel 6 and spaced inwardly therefrom are a companion pair of pillow blocks 11. Each of the pillow blocks 10 and 11 carries a bearing 12. A shaft 13 is journaled in the bearings 12 carried by the pillow block 10 and one pillow block 11 on one side of the device 1 and in similar fashion a shaft 14 is journaled in the bearings carried by the other pillow blocks 10 and 11. A roll 15 is carried upon shaft 13 between the pillow blocks 10 and 11 and a similar roll 16 is carried in similar fashion upon shaft 14, each roll being rigidly secured to its respective shaft.

In similar fashion a pair of pillow blocks 17 are mounted upon an endmost cross channel 6 at the opposite end of the channel irons 4 and 5 and a companion pair of pillow blocks 18 are carried upon a cross channel 6 spaced inwardly from the aforesaid endmost cross channel. Each of the pillow blocks 17 and 18 carries a bearing (not shown) similar to bearings 12. In one spaced pair of bearings carried by one pillow block 17 and one pillow block 18 a shaft 19 is journaled, said shaft carrying a roll 20. In the other pair of bearings the shaft 14 which carries roll 16, is journaled, said shaft, between the pillow blocks 17 and 18, carrying a roll 21. The rolls 15, 16, 20 and 21 are all of the same length and diameter and are otherwise similar to one another. The arrangement is such, however, that rolls 16 and 21 rotate together by virtue of being carried on the common shaft 14 whereas rolls 15 and 20 rotate independently of each other and of the rolls 16 and 21.

The rolls 15, 16, 20 and 21 extend above the surface of plate 9, each pair of rolls 15 and 16, and 20 and 21 being adapted to support the tire of one rear wheel of a motor vehicle, as shown best at 22 in Fig. 2. It will be noted that the tire, when supported as shown at 22 in Fig. 2 extends below the surface of the plate 9 between the supporting rolls 15 and 16. Therefore, in order to permit free rotation of the tires on the rolls, the closure plate for the pit 2 adjacent the various rolls is depressed below the surface of plate 9. To accomplish this end, offset frame members 23 and 24 extend inwardly from the edges of plate 9 which define apertures 25 provided in plate 9 adjacent rolls 15 and 16, and 20 and 21, said frame members being secured to channel members 27 carried by cross channels 6 (Fig. 3). Each of the frame members 23 and 24 carry flanges which underlie plate 9 and said frame members are curved downwardly to a lower elevation than plate 9. At the lower edges of the frame members a flat plate 28 is carried which lies in a plane beneath the plane of plate 9.

Thus the plate 28 will not interfere with the free rotation of the automobile tires when the rear wheels of the vehicle are carried by the rolls, as hereinbefore described. In addition, in the event that the wheels of the vehicle are not centered upon the rolls, the edge of the tire may bulge over the ends of the rolls. By reference to Fig. 3, it will be noted that the defining edge of plate 9 is spaced from the ends of the rolls, said space being bridged by the frame members 24. Hence, in the event that the vehicle tires are not properly centered upon the rolls and if the sides of the tire bulge over the ends of the rolls, said bulged portion of the tire will not rub upon a stationary surface by virtue of the depressed or downwardly curved frame members 24.

In employing the present invention the rear wheels of a vehicle under test are adapted to be disposed upon the rolls 15, 16, 20 and 21, as hereinbefore described. However, if all of said rolls were freely rotatable at all times it would be substantially impossible or at least extremely difficult to drive the vehicle upon the rolls since the torque of the rear wheels would be expended in merely rotating the rolls which the rear tires initially contact. Hence, means is herein contemplated for controllably locking predetermined rolls, as will be hereinafter more fully described, to permit the vehicle to be conveniently run on and off the testing device.

To controllably lock some of the rolls, a fulcrum rod 29 is secured to one of the endmost channels 6, said fulcrum rod carrying at its end a fulcrum pin 30 upon which a lever 31 is pivoted intermediate its length. At one end the lever 31 is pivotally connected to a pedal rod 32, as at 33 in Fig. 5. The plate 9 is provided with an aperture 34 adjacent roll 15 and an end portion of the pedal rod 32 extends upwardly through said aperture, said pedal rod at its end carrying a pedal 35. The pedal rod 32 also carries a shoulder member 36 which is positioned intermediate the length of the rod 32 but adjacent the pedal 35. A coil spring 37 is anchored to screw 38 mounted in the pedal rod 32. At the opposite end the coil spring 37 is anchored to a pin 39.

The arrangement is such that coil spring 37 normally urges pedal rod 32 in a counterclockwise direction about pivot 33, as viewed in Fig. 5. As will be hereinafter more fully described, the lever 31 is resiliently urged in a counterclockwise direction about fulcrum pin 30 as viewed in Fig. 5 and hence the pedal rod 32 tends to move axially outwardly through the aperture 34. However, spring 37 which tends to rock the pedal rod 32 in a counterclockwise direction, as viewed in Fig. 5, tends to move said rod in such fashion that the shoulder member 36 will engage the lower surface of plate 9. Consequently, at certain phases of the operation, the shoulder member 36 engages the lower surface of the plate 9 and prevents rocking of the lever 31 in a counterclockwise direction as viewed in Fig. 5. At other phases of operation of the device it is desired to permit lever 31 to rock in the counterclockwise direction and in order to permit such movement the operator, with his foot depresses the pedal 35 to disengage the shoulder member 36 from the lower surface of the plate 9 and the operator then moves the pedal rod in a clockwise direction about pin 33, as viewed in Fig. 5. Thus, the shoulder member 36 is disengaged from the lower surface of the plate 9 and the pedal rod 32 is permitted, together with the shoulder member 36, to pass upwardly through the aperture 34 thus permitting the counterclockwise rocking of the lever 31.

Adjacent the opposite end of lever 31 a bolt 40 secures said lever to an adjustable link 41, the arrangement being such that the link 41 may pivot a limited distance about the bolt 40. The lever 41 is provided with a slot 42 which extends at substantially right-angles to the axis of said lever. A bolt 43 extends through the slot 42 and through an opening in the link 41. The bolt also extends through angle member 44, the flange 45 of which carries an adjusting screw 46 which bears, at one end, upon the upper edge of the lever 31. The arrangement is such that by the manipulation of screw 46 the link 41 may be swung a limited distance in a clockwise or counterclockwise direction about the bolt 40 which raises or lowers the lower edge of the link relative to the lower edge of the lever 31. As will be hereinafter more fully described this arrangement constitutes an adjustment for desirably orienting the various parts of the lock hereinafter described.

The opposite end of the link 41 carries an upwardly extending plate 47 which is rigidly secured to said link. A pair of anchor pins 48 are mounted upon an end portion of the member 47 and each pin serves as an anchor for one end of a coil spring 49. A pair of spaced plates 50 are rigidly mounted upon the member 6, one of said plates carrying bar 51 which is rigidly secured to said plate by screws 52. The extending end portion of the member 51 carries pins 53 upon which the opposite ends of the respective springs 49 are anchored.

The arrangement is such that the springs 49 are normally under tension and tend to rock link 41 and lever 31 in a counterclockwise direction about the pivot 30, as viewed in Fig. 5. This is the resilient force, hereinbefore described, which normally urges the pedal rod 32 upwardly through the aperture 34. Although a pair of springs 49 are shown and described, said springs may be replaced by a single spring. However, in employing the two springs, one spring will always function as a stand-by in the event that the other spring breaks. However, in so far as the function of the springs is concerned a single spring would operate as satisfactorily.

A rod 54 is carried by the plates 50 and extends between said plates. A bell crank lever 55 is pivotally mounted upon the rod 54. One arm 56 of the bell crank lever is positioned immediately beneath the lower edge of link 41 and is adapted to be contacted by said link when the lever 31 is permitted to rock about the fulcrum pin 30 in a clockwise direction under the influence of springs 49. The opposite arm of the bell crank lever 55 comprises a yoke 57 which embraces a locking pin 58.

A sleeve 59 is carried by the web of the channel member 6 and the pin 58 is slidably movable in said sleeve. A pair of spaced supports 60 (Fig. 4) are mounted upon the sleeve 59 and at their extending ends carry a U-shaped abutment member 61. A coil spring 62 embraces the pin 58 and abuts at one end upon the abutment member 61. A washer 63 is carried by the pin 58 and the opposite end of the coil spring 62 abuts against said washer. The arrangement is such that the yoke 57 of bell crank lever 55 is disposed in embracing relationship on each side of pin 58 adjacent the washer 63. Hence, when the bell crank lever 55 is rocked about the rod 54 in a clockwise direction, as viewed in Fig. 7, the yoke 57 contacts washer 63 which is rigidly carried by the pin 58 and tends to move said pin through the sleeve 59 in a direction toward the right, as viewed in Fig. 7. Such movement compresses the spring 62 and when the force which was applied to the bell crank lever to occasion this movement is relieved, the spring 62 tends to move the pin 54 from right to left through sleeve 59, as viewed in Fig. 7.

The end of pin 58 moves adjacent an end wall 64 of roll 16 and said end wall is provided with an aperture 65. When the center of the aperture is in alignment with pin 58 and said pin is urged outwardly, as hereinbefore described, the pin enters the aperture 65 and functions to lock the roll 16. The end portion of the pin 58 is chamfered as shown best at 66 in Fig. 7 whereby said pin may conveniently enter the aperture 65 without gouging the end of the pin or the defining edges of the aperture.

In the operation of the present device when it is desired to position the rear or driving wheels of a motor vehicle upon the rolls 15 and 16, 20 and 21, it will be noted that the roll 16 is locked as the position of the parts illustrated indicate. In view of the fact that the roll 16 is locked and said roll is rigidly carried upon the shaft 14, the roll 21 will also be locked since it is also rigidly carried upon the shaft 14. Hence, both rolls 16 and 21 are locked and consequently the driving wheels of the vehicle can secure purchase upon said rolls and move the vehicle in such manner as to position the tires of the rear wheels upon the respective rolls as indicated at 22 in Fig. 2.

The operator then depresses pedal 35 and swings said pedal against the tension of spring 37 about the pivot 33 to disengage the shoulder member 36 from the lower surface of the plate 9. The tension of springs 49 then rock link 41 and lever 31 is a counterclockwise direction, as viewed in Fig. 5, until the lower edge of link 41 contacts the upper edge of arm 56 of the bell crank lever 55. Springs 49 are stronger than spring 62 and hence the yoke 57 of bell crank lever 55 compresses spring 62 by moving the pin 58 outwardly from the aperture 65 in roll 16. In this fashion, roll 16, and hence, roll 21, are unlocked and both rolls are free to rotate.

One of the tests which may be made upon an automobile employing the device 1 is to test the operation of the automatic transmission. Hence, when the rolls 16 and 21 are unlocked, and with the transmission lever of the vehicle in "drive" the vehicle motor may be speeded up and the rotation of the rear wheels of the vehicle is accommodated by the freely rotatable rolls 15, 16, 20 and 21. Accordingly, as the vehicle motor accelerates in speed and the rear wheels of the vehicle are speeded up, the automatic shifting of the transmisison is noted, giving the operator substantially the same indications he would receive were the automobile subjected to a conventional road test. Thus, the present device comprises a simple mechanism which may be conveniently installed in a shop or garage and upon which observations may be made upon the performance of a motor vehicle which could be secured in substantially no other way but a road test.

When the test is completed and it is desired to remove the vehicle from the device 1, the operator depresses the pedal 35 thus relieving the force applied to the arm 56 of the bell crank lever 55. The spring 62 is then free to move the pin 58 outwardly. Then, by a slight movement of roll 16, in order to align aperture 65 with the end pin 58, the pin may then enter the aperture 65 and lock roll 16 and also roll 21. To hold the pin 58 in its outwardly extending position, the pedal rod 32 may be swung in a counterclockwise direction, as viewed in Fig. 5, until the shoulder member 36 engages the lower surface of the plate 9.

It is apparent that herein is provided a device upon which road conditions may be simulated in testing certain characteristics of the operation of an automobile garage. It is also apparent that many unpatentable modifications may be made in the present invention without while the automobile may be maintained in a shop or departing from the spirit of the invention and hence it is not intended that the present invention be limited to the exact details shown and described except as necessitated by the appended claims.

I claim as my invention:

1. A device for simulating road conditions for testing an automobile which comprises, a frame adapted for disposition in a pit in a floor, a closure for said frame and said pit having portions substantially flush with said floor, two pairs of axially spaced horizontally disposed freely rotatable rolls carried by said frame, said closure being provided with a plurality of spaced apertures through which portions of the upper arcuate surfaces of said rolls respectively extend above the surface of said closure and above said floor, the axes of each pair of rolls being disposed parallel to each other and laterally spaced to support the tires of automobile driving wheels thereupon whereby the driving wheels of the automobile may be rotated while supported upon said rolls, the upper surface of said closure between said rolls and outwardly from the ends of said rolls being at a lower level than the level of said floor whereby those portions of the tires between said rolls and adjacent the ends thereof are spaced from the upper surface of the closure, a common shaft upon which a corresponding roll of each pair of rolls is rigidly mounted, and means for locking one roll carried by said common shaft to permit movement of the automobile onto and off of said rolls under the power of its driving wheels, said locking means comprising a locking pin carried by said frame, said locked roll being provided with a recess for receiving a portion of said pin to lock said roll relative to said frame, resilient means for urging said pin into said recess, and means carried by said frame for retracting said pin from said recess against the compression of said resilient means, said retracting means comprising a bell crank lever one arm of which retracts said pin when said lever is rocked, a spring-urged bar contacting the other arm of said bell crank lever to retract said pin, and means upon said frame for holding said bar in spaced relationship to the adjacent arm of said bell crank lever.

2. A device in accordance with claim 1 wherein said bar comprises a link and a lever, adjustable means for connecting said link and said lever, means carried by said frame for pivotally carrying said lever, and pedal means for rocking said lever to space said link from said bell crank lever.

3. A device in accordance with claim 2 wherein said pedal means is pivotally secured to said lever and extends upwardly from said frame to project above said floor.

References Cited in the file of this patent

UNITED STATES PATENTS

| | | |
|---|---|---|
| 1,009,204 | Winden | Nov. 21, 1911 |
| 1,222,336 | Stephens | Apr. 10, 1917 |
| 1,415,460 | Lindecker | May 29, 1922 |
| 1,548,193 | Fennell | Aug. 4, 1925 |
| 2,130,900 | Presbrey | Sept. 20, 1938 |
| 2,144,010 | Bennett | Jan. 17, 1939 |
| 2,803,132 | Clayton | Aug. 20, 1957 |